J. L. TATE.
CARBURETER AND CONTROLLER FOR INTERNAL COMBUSTION ENGINES.
APPLICATION FILED JAN. 21, 1909.

954,359.

Patented Apr. 5, 1910.

WITNESSES
Edward Thorpe
C. W. Fairbank

INVENTOR
John Lincoln Tate
BY
ATTORNEYS ic_ref id="N" />
UNITED STATES PATENT OFFICE.

JOHN LINCOLN TATE, OF JERSEY CITY, NEW JERSEY.

CARBURETER AND CONTROLLER FOR INTERNAL-COMBUSTION ENGINES.

954,359.  Specification of Letters Patent.  Patented Apr. 5, 1910.

Application filed January 21, 1909. Serial No. 473,432.

*To all whom it may concern:*

Be it known that I, JOHN LINCOLN TATE, a citizen of the United States, and a resident of Jersey City, in the county of Hudson and State of New Jersey, have invented a new and Improved Carbureter and Controller for Internal-Combustion Engines, of which the following is a full, clear, and exact description.
This invention relates to certain improvements in the means employed for supplying explosive mixture to internal combustion engines, and one object is to provide for the automatic controlling of the supply of explosive mixture or one constituent thereof so that the speed of the engine may be governed.

The invention is particularly applicable to systems in which an internal combustion engine is employed for driving a generator and the current from the generator is used for operating a motor or for doing any other suitable form of work. Such a system is illustrated, for instance, in my prior application, No. 466,808, filed December 10, 1908. I use any suitable liquid fuel, as for instance, kerosene or crude oil, having a comparatively low vaporizing point, and utilize a portion of the electric current generated for heating a resistance coil adjacent the liquid fuel, so as to vaporize the latter. As the amount of current flowing through the circuit which includes the generator and motor varies with the load on the motor, the temperature of the resistance coil is correspondingly varied. A variation in the temperature of the coil varies the rate of vaporization of the liquid fuel and its delivery to the engine, so that the speed of the engine is varied automatically with the load imposed upon the motor.

Reference is to be had to the accompanying drawings, forming a part of this specification, in which similar characters of reference indicate corresponding parts in both the figures, and in which—

Figure 1:
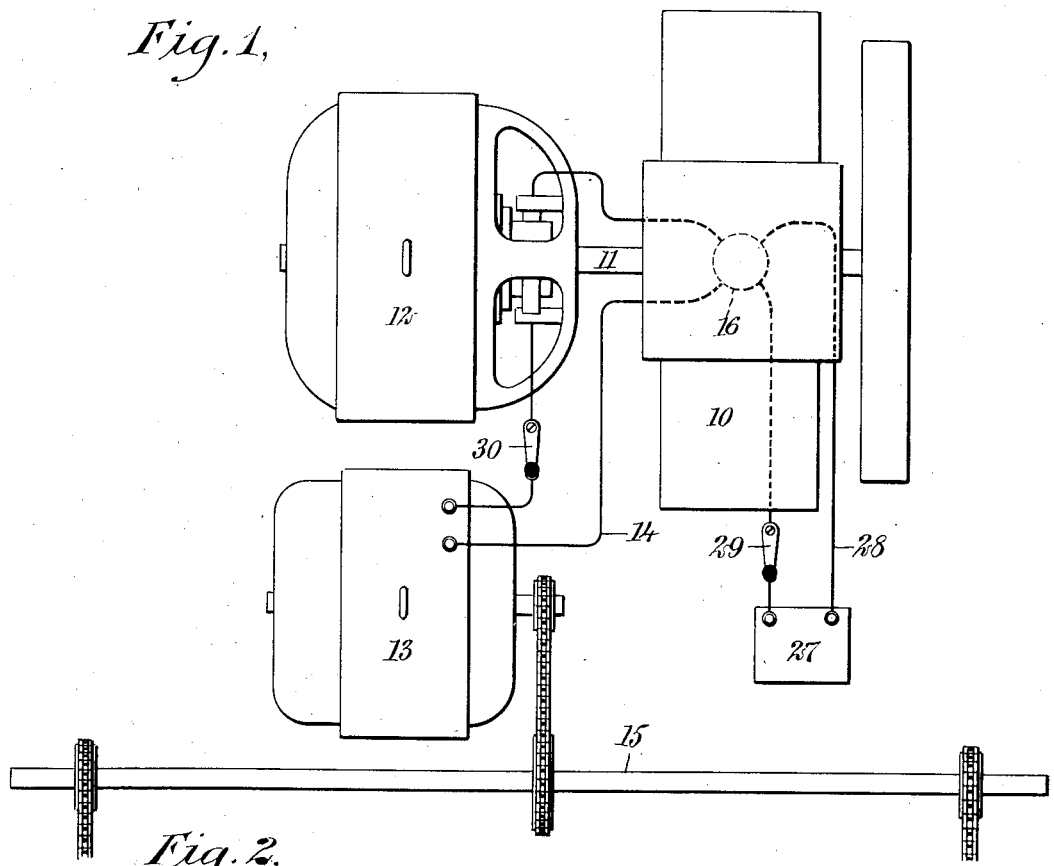
Figure 2:
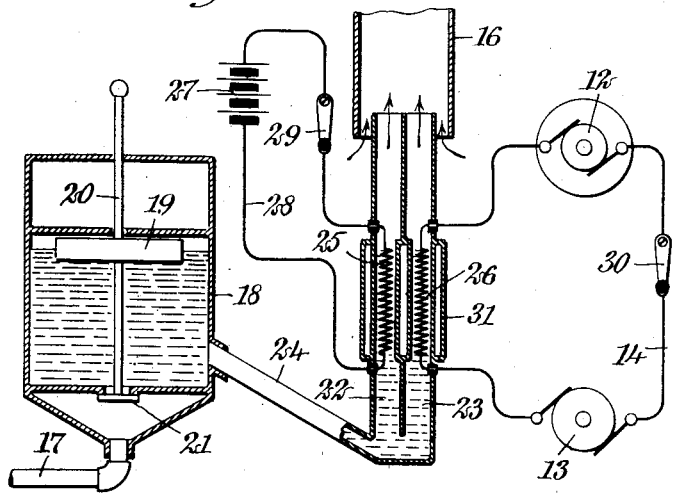

Figure 1 is a diagrammatic view of a portion of a power system, as, for instance, that shown in my prior application above referred to and having my present invention applied thereto; and Fig. 2 is a vertical section through the carbureter showing the electric circuits diagrammatically.

My invention may be utilized in connection with any internal combustion engine, but it has its broadest application in connection with an engine used for driving an electric generator.

In the drawings, I have illustrated conventionally, an engine 10 having a shaft 11, directly connecting it to an electric generator 12, the engine, generator and connections being of any suitable character. The current generated in the dynamo or generator 12 is delivered to an electric motor 13 by means of suitable wiring 14, and the motor may have sprocket-and-chain connections to a shaft of any suitable character. The engine, dynamo and motor may all be carried by a vehicle, and the shaft 15 may have its opposite ends connected to the rear wheels of the vehicle. The engine is, of course, provided with an inhaust pipe 16, which is illustrated in dotted lines in Fig. 1, and upon an enlarged scale in Figs. 2 and 3.

In connection with the parts above referred to, I employ my improved charge-forming means which also operates to control the speed of the engine. In the specific form illustrated in Fig. 2, the liquid fuel is delivered from a reservoir of any suitable character through a conduit 17 to a float chamber 18. Any suitable float chamber may be employed, but that illustrated includes a float 19 connected by a valve stem 20 to a valve 21 controlling the admission to the chamber. Adjacent the float chamber 18 is a vertically-disposed conduit having two separate passages 22 and 23 open at their outer ends. Both passages at their lower ends are connected to the lower portion of the float chamber by a conduit 24. The upper ends of the passages 22 and 23 are at a higher elevation than the float 19, so that the liquid cannot directly escape but will be maintained at substantially the same elevation in the two conduits as in the float chamber. The two conduits 22 and 23 terminate closely adjacent to or within the inlet end of the inhaust pipe 16, but sufficient space is left between said conduits and said inhaust pipe to permit the entrance of air around the conduits.

For vaporizing the liquid fuel, I provide resistance coils 25 and 26 in the two conduits 22 and 23, and connect up these coils for the delivery of electric current therethrough. One of the coils, for instance, coil 25, is connected to a storage battery 27 by wiring 28, the circuit being broken or closed by a switch 29. The other coil 26 is directly included as a portion of the wiring 14 through which the current flows from the dynamo 12 to the motor 13. Within this circuit is a suitable switch or other controller 30, for starting or stopping the motor or for controlling the flow of current therethrough. The two coils 25 and 26 are insulated from the walls of the conduit and each coil is adapted to its source of electrical energy. The conduits adjacent the coils are preferably provided with insulating jackets 31 for conserving the heat generated by the coils.

When it is desired to start the engine the switch 29 is closed so that electric current will be delivered through the coil 25 and the liquid fuel within the conduit 22 will be vaporized and delivered into the inhaust pipe 16. The piston of the engine draws in air about the conduit 22 which is mixed with the vaporized liquid fuel and the two enter the engine together to form an explosive mixture. As soon as the engine takes up its cycle of operations, the dynamo 12 is started in operation and a current is delivered through the circuit 14 to operate the motor the instant the switch 30 is closed. The current flowing through the circuit 14 heats the coil 26, which will operate in conjunction with the coil 25 to deliver the combustible constituent of the explosive mixture. The coil 26 may be so proportioned and designed as to vaporize the full quantity of fuel needed for the engine so that as soon as the engine is in operation, the switch 29 may be opened and the storage battery thrown out of operation, or the coil 25 may operate continuously and at a uniform temperature, while the coil 26 will operate in conjunction therewith and at a variable temperature, as will be seen from the following: If the system be employed for driving a vehicle or if it be employed in any other connection in which the load on the motor varies through wide limits, my improved carbureter will operate to automatically vary the speed of the engine in accordance with the load on the motor. If the dynamo runs at constant speed and the load on the motor is decreased, the current delivered to the motor will be also decreased and the reduction in the current in the circuit will decrease the heating action of the resistance coil 26. As the temperature of the coil 26 decreases, a lesser quantity of the liquid fuel will be vaporized and supplied to the engine, so that the latter will decrease its speed due to the decreased supply of fuel. An increase in the load on the motor will operate in corresponding manner to increase the fuel supply to the engine, and therefore increase its speed and power. By thus automatically regulating the supply of fuel in accordance with the load, I avoid the necessity for any hand-regulating means for the carbureter, or any throttle for the engine. The amount of energy utilized in vaporizing the fuel is almost infinitesimal compared with the energy available, and the presence of the resistance coil 26 will affect the circuit to an almost inappreciable extent. By using the electric heating coil directly in the fuel, I am able to employ kerosene, crude oil, or other combustible liquid having a comparatively low vaporizing point, in place of the more expensive and more volatile liquids, as, for instance gasolene and benzene, which are now employed.

Having thus described my invention, I claim as new and desire to secure by Letters Patent:

1. In combination, an internal combustion engine, a dynamo driven thereby, a motor, electric connections between said dynamo and said motor, and a coil included in said connections for heating fuel for delivery to the engine.

2. In combination, an internal combustion engine, a dynamo driven thereby, a motor, electric connections between said dynamo and said motor, and a coil included in said connections for vaporizing liquid fuel for delivery to the engine.

3. In combination, an internal combustion engine having an inhaust pipe, a container for liquid fuel, a conduit leading from said container and having an upwardly-extending portion delivering to said inhaust pipe but spaced therefrom to permit the admission of air to the latter, an electric heating coil directly immersed within the liquid within said upwardly-extending conduit and operating to vaporize the liquid fuel and deliver said vapor to the inhaust pipe, a dynamo driven by said engine, and a motor operated by the current from said dynamo, said coil constituting a portion of the connections between said motor and said dynamo, whereby a variation in the current delivered to said motor varies the supply of fuel delivered to said engine.

4. In combination, an internal combustion engine, a dynamo driven thereby, an electric coil connected to said dynamo for heating fuel delivered to said engine, a battery, and an electric coil connected to said battery for heating the fuel delivered to said engine independently of the dynamo.

5. In combination, an internal combustion engine, a liquid fuel delivery conduit subdivided into two chambers, each having an open top, separate electric heating coils in said chambers, means operated by the engine for energizing one of said coils, and means independent of the engine for energizing the other coil.

6. In combination, an internal combustion engine, a dynamo driven thereby, a motor operated by the current from the dynamo, and an electric heating coil for heating the fuel for delivery to the engine, said coil receiving current in accordance with the load on the motor.

7. In combination, an internal combustion engine, a dynamo driven thereby, a motor operated by the current from the dynamo, and an electric heating coil for vaporizing the liquid fuel delivered to the engine, the heating of said coil being in accordance with the load on the motor to vary the composition of the explosive charge.

8. In combination, a dynamo, an internal combustion engine serving primarily to drive said dynamo, means for utilizing the electric energy from said dynamo, and means for vaporizing fuel for the engine in accordance with the load on said energy-utilizing means.

9. In combination, a dynamo, an internal combustion engine serving primarily to drive said dynamo, means for utilizing the electric energy from said dynamo, and an electric heating coil for heating the fuel for delivery to the engine, said coil receiving current in accordance with the load on the energy-utilizing means.

10. In combination, a dynamo, an internal combustion engine connected to said dynamo and serving primarily to operate said dynamo, connections to said dynamo for delivering the generated current for doing work, and a coil in said connections for vaporizing liquid fuel for the engine and acting to vary the supply of fuel to the engine in accordance with the load imposed on the dynamo.

11. In combination, a dynamo, an internal combustion engine connected to said dynamo and serving primarily to operate said dynamo, connections to said dynamo for delivering the generated current for doing work, and a coil energized from said dynamo for heating fuel for the engine and acting to vary the supply of fuel to the engine in accordance with the load imposed on the dynamo.

In testimony whereof I have signed my name to this specification in the presence of two subscribing witnesses.

JOHN LINCOLN TATE.

Witnesses:
F. M. DECKER,
GRANT SCOTT.